Dec. 16, 1952  E. L. AHLGREN  2,621,732
GUN

Filed Feb. 24, 1947  2 SHEETS—SHEET 1

Inventor
Erick L. Ahlgren
By E. S. Hardway
Attorney

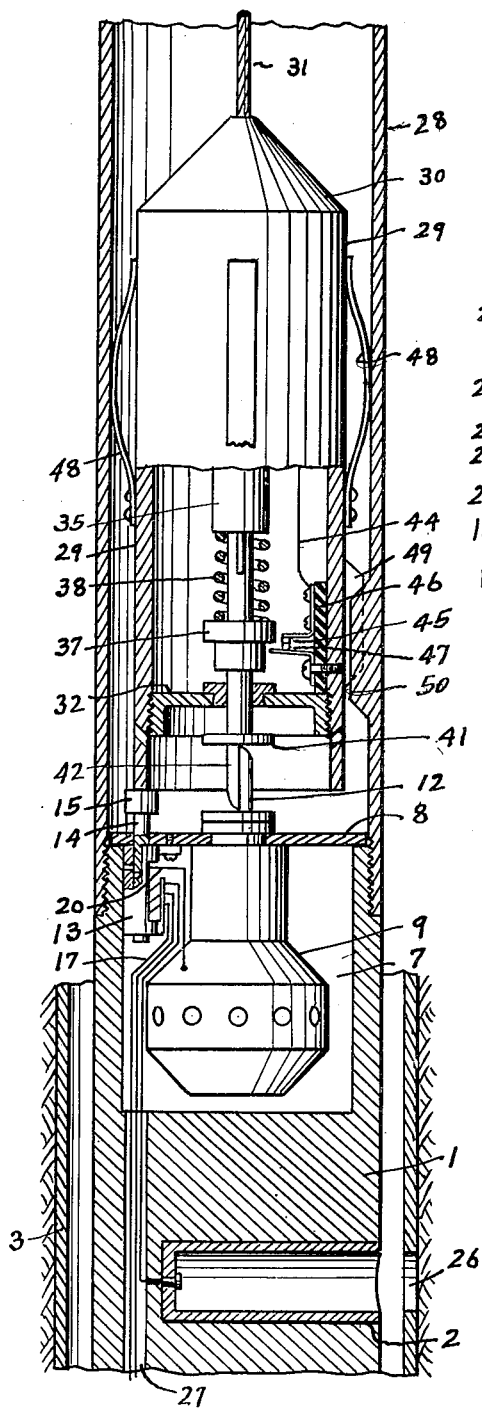

Patented Dec. 16, 1952

2,621,732

UNITED STATES PATENT OFFICE 2,621,732

GUN

Erick L. Ahlgren, Houston, Tex.

Application February 24, 1947, Serial No. 730,369

10 Claims. (Cl. 164—0.5)

This invention relates to a gun and has more particular relation to that type of gun designed for perforating pipe in a well bore.

An object of the invention is to provide a gun of the character described shaped to be lowered into a well and including a gun body having radial barrels loaded with explosive charges and projectiles with novel means for firing the charges.

The novel firing means includes an electric generator in the body and electrical conductors formed with filaments in the charges in the barrel with means for successively completing the electrical circuits from the generator through the conductors whereby the charges may be successively fired in combination with an electric motor for driving the generator and which may be operatively connected with and disconnected from the generator at the will of the operator; the novel means for firing the charges also includes switch means whereby the circuits may be successively completed from the generator to the respective charges by the operator as the motor is manipulated to connect it with the generator.

Other objects and advantages will be apparent from the following description which is illustrated by the accompanying drawings wherein:

Figure 4 is an enlarged, vertical, sectional view of the switch mechanism.

Figure 5 is a transverse, sectional view thereof taken on the line 5—5 of Figure 4, and Figure 6 is a fragmentary, side elevation, partly in section, of the gun showing the motor operatively connected with the generator.

Figure 1:
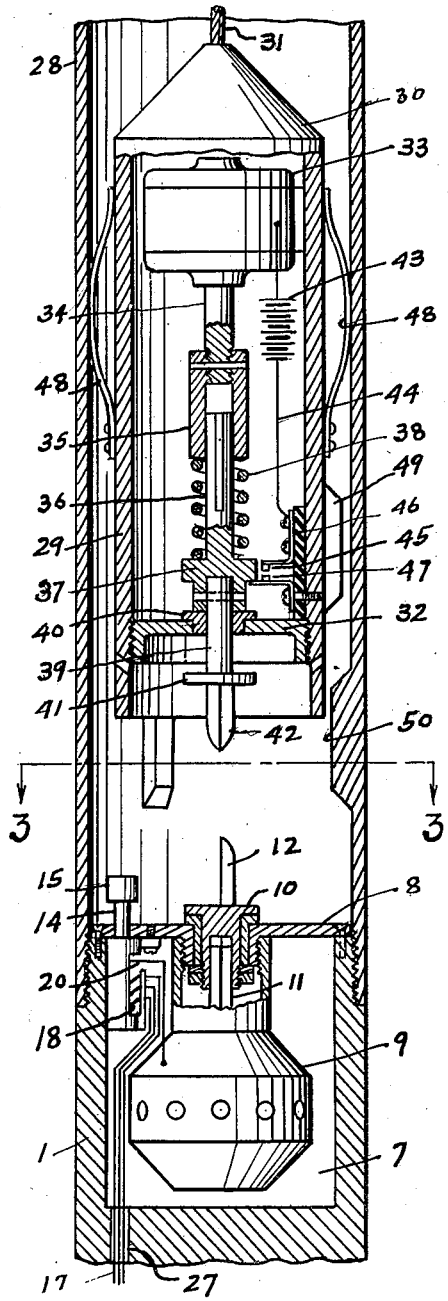
Figure 1 is a vertical, sectional view of the upper end of the gun showing the motor disconnected from the generator.
Figure 2:
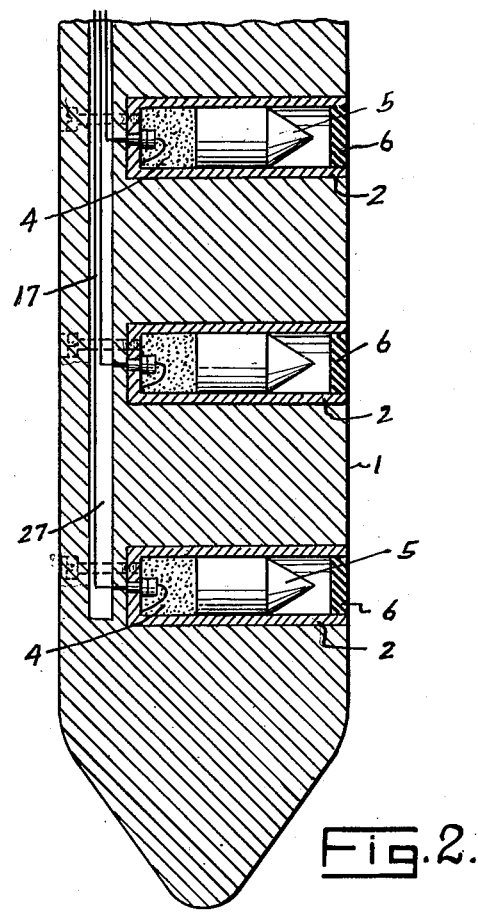
Figure 2 is a vertical, sectional view of the lower end thereof.
Figure 3:
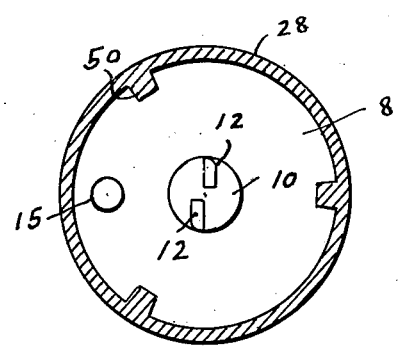
Figure 3 is a cross-sectional view taken on the line 3—3 of Figure 1.

Referring now more particularly to the drawings wherein like numerals of reference designate similar parts in each of the figures, the numeral 1 designates the gun body which is pointed at its lower end so that it may be more readily guided into the well pipe to be perforated.

In the body there are a plurality of radial barrels 2 which, in the present illustration, are shown directed in the same direction but in practice they will radiate around the body so as to perforate the well casing 3 on all sides.

In each barrel there is an explosive charge 4 and in front of it a projectile 5 whose outer end is, preferably, pointed.

When the gun is loaded for use the outer ends of the barrels will be closed by a suitable plug 6 which is easily displaced when the gun is fired.

The upper end of the gun body is formed with a chamber 7 whose upper end is closed by a transverse partition 8 and anchored to this partition and depending into the chamber there is the electric generator 9, which runs in light fluid, such as oil.

Rotatably mounted in a central bearing in the partition 8 there is a clutch member 10 into the lower end of which the generator shaft 11 extends. This shaft is polygonal in cross-section and is fitted into a correspondingly shaped socket in the lower end of the clutch member 10.

Upstanding from this clutch member there are the clutch prongs 12, 12 for a purpose to be hereinafter explained.

Anchored to and depending from the partition 8 and located in the chamber 7 there is a bracket 13 and slidably mounted in this bracket there is a switch member 14 whose upper end is formed with an enlarged head 15.

Secured to, and upstanding from, the lower end of the bracket, and located within the chamber 7, there is an anchor 16 formed of insulating material and conductors 17 are connected, at their upper ends, to this anchor and are in contact with corresponding flexible brushes 18 which are carried by said anchor 16, as more clearly shown in Figure 4. These conductors 17 are formed into filaments in the explosion chambers of the barrels 4 and are grounded on the body.

Countersunk into, and insulated from, the switch member 14 there is a contact plate 19 formed of conducting material and an electrical conductor 20 leads from the generator and is connected to said plate, as shown in Figures 1 and 6.

The switch member 14 may be pinned in the bracket 13 by means of a frangible pin 21 and said switch member is provided with elongated slots 22 and 23, the slot 23 being slightly longer than the slot 22 and frangible pins 24 and 25 are anchored to the bracket 13 and their inner ends project into these respective slots 22 and 23.

Upon application of a predetermined amount of downward pressure on the switch member 14 the pin 21 will be sheared and the switch member may be moved downwardly until stopped by the pin 24 and this will bring the upper brush 18 into contact with the plate 19 and complete an electrical circuit through the corresponding conductor 17 to fire the charge corresponding to said conductor. Thereafter upon application of said downward pressure to the switch member 14 the pin 24 will be sheared allowing said switch member to move further downwardly to bring the plate 19 into contact with the next succeeding brush to complete a circuit through the conductor 17 with which said last mentioned brush is connected and upon further downward movement of the switch member 14 the pin 25 will be sheared so as to bring the contact plate 19 into contact with the next succeeding brush 18 to complete a circuit through the corresponding conductor 17 and fire the charge with which it is associated. In other words by successive downward movements of the switch member 14 the charges may be fired in succession and the projectiles 5 projected outwardly through the casing 3 to form perforations as 26 therein.

The gun body is provided with a longitudinal bore 27 in which the conductors 17, leading to the firing charges, may be located.

The gun body may be connected to the lower end of a string of tubing 28 and lowered into the well to the desired location where it is intended to perforate.

The numeral 29 designates an enclosing housing which is closed, at its upper end, by a cap 30 containing a conventional rope socket to which the lower end of the cable 31 may be connected.

The lower end of this housing may be closed by means of a plug 32 which may be screwed therein.

Fastened in the upper end of the housing there is an electric motor 33 having the depending shaft 34 to the lower end of which a driving coupling 35 may be secured.

There is an intermediate shaft 36 whose upper end is splined in the coupling 35 and whose lower end is formed with an enlarged head 37.

Surrounding the shaft 36 and interposed between the lower end of the coupling 35 and the head 37 there is a strong coil spring 38.

Telescoping into the lower end of the shaft 36 and pinned therein there is a lower shaft 39 which works through a central bearing 40 in the plug 32.

The lower end of the shaft 39 has a disc 41 fixed thereon depending from which there are the clutch prongs 42 arranged to interengage with the clutch prongs 12 when the housing is lowered, as indicated in Figure 6, so that upon rotation of the motor the generator 9 will be driven and an electrical current generated.

Within the housing 29 there is a source of electrical energy, such as a battery 43. This battery is connected into an electrical conductor 44 leading from the motor and connected to the contact point 45 which is anchored to an insulator 46 carried by the wall of the housing 29.

Anchored to the wall of the housing 29 there is a yieldably mounted contact point 47 which is normally held spaced from the contact point 45 by means of the head 37, as shown in Figure 1, so that the electrical circuit from the battery 43 to the motor 33 will be broken.

There are the flexible friction arms 48 whose lower ends are secured to the housing 29 and which are outwardly bowed and whose upper ends are free, as shown in Figures 1 and 6, and which frictionally engage the inside of the string 28 as the housing is lowered therethrough by the cable 31. These bowed springs maintain the housing 29 centered relative to the tubing string.

In operation when it is desired to fire the gun, located in the well, the housing 29 with the motor and operative mechanism installed therein, may be lowered into the string until the clutch prongs 42 come into clutching relation with the prongs 12, as shown in Figure 6, whereupon the shafts 39 and 36 will be forced upwardly, compressing the spring 38, as indicated in Figure 6, and the head 37 will release the flexibly mounted contact point 47 and allow it to come into contact with the contact point 45 thus completing an electrical circuit through the motor 33 and starting the motor. The generator 9 will thereupon be driven and an electric current generated. The housing 29 may then be further lowered and it will come into contact with the head 15 and will shear the pin 21 moving the switch member 14 downwardly until it is stopped by the pin 24 and bringing the contact plate 19 into contact with the upper brush 18 thus completing a circuit through one of the conductors 17 and firing the corresponding charge. Thereupon the housing may be allowed to move further downwardly until the pin 24 is sheared and the contact member 14 stopped by the pin 25 and, in a similar manner to that above explained, the next succeeding charge will be fired and upon further downward movement of the housing 29 the pin 25 will be sheared bringing contact plate 19 into contact with the next succeeding brush 18 causing firing of the next succeeeding charge. It may be here stated that the shear pins 21, 24 and 25 have been shown only as a matter of illustration. It is, of course, obvious that other well known interlocking means may be employed for temporarily locking the contact member 14 with the bracket 13.

When the generator driving assembly, above described, is in driving relation with the generator the housing 29 is maintained against reverse rotation by means of external longitudinal lugs 49 on the housing 29 which interengage with similar, internal longitudinal lugs 50 within the lower end of the string of tubing 28, as is illustrated in Figure 6.

The drawings and description are illustrative merely while the broad principle of the invention will be defined by the appended claims.

What I claim is:

1. A well shooting gun comprising; a gun body having a radial barrel with a projectile, and an explosive charge behind the projectile, in the barrel; an electric generator on the body; ignition means in the body for igniting the charge; an electrical conductor leading from the generator to said ignition means and including a switch; generator driving means, interengageable means on the generator and driving means for connecting the driving means in driving relation with the generator, and means under the control of an operator at the ground surface operatively connected to said driving means and operable to engage and disengage said interengageable means.

2. A well shooting gun comprising; a gun body having a radial barrel with a projectile, and an explosive charge behind the projectile, in the barrel; an electric generator on the body; ignition means in the body for igniting the charge; an electrical conductor leading from the generator to said ignition means and including a switch; generator driving means, interengageable means on the generator and driving means for connecting the driving means in driving relation with the generator, and means under the control of an operator at the ground surface operatively connected to said driving means and operable to engage and disengage said interengageable means, and means on said switch and said interengageable means operable upon engagement of the interengageable means to close said switch.

3. A well shooting gun comprising; a gun body having a barrel extending transversely of the body; a projectile and an explosive charge behind the projectile, in the barrel; ignition means in the body for firing the charge; an electric generator on the body; electrical conducting means leading from the generator to the ignition means and including a switch; generator driving means, interengageable means on the generator, said driving means for connecting the driving means in driving relation with the generator and means accessible to an operator at the ground surface operatively connected to said driving means and operable to engage and disengage said interengageable means.

4. A well shooting gun comprising; a gun body having a barrel extending transversely thereof; a projectile and an explosive charge behind the projectile, in the barrel; ignition means in the body for firing the charge; an electric generator on the body; an electrical conductor leading from the generator to the ignition means and including a switch for completing and breaking a circuit through the conductor; generator driving means; interengageable means on the generator and driving means for connecting the driving means in driving relation with the generator, and means accessible to an operator at the ground surface mechanically connected to the driving means and operable to engage and disengage said interengageable means, and means on said switch and said interengageable means operable upon engagement of the interengageable means to close said switch.

5. A well shooting gun comprising; a gun body having a barrel extending transversely of the body; a projectile and explosive charge behind the projectile, in the barrel; ignition means in the body for firing the charge; an electric generator on the body; an electrical conductor leading from the generator to the ignition means and including a switch; tubing connected to the body for lowering the body into the well; generator driving means adapted to be lowered through the tubing into operative relation with the generator and through which the generator may be driven; clutch means carried by the driving means and generator whereby they may be operatively connected and disconnected; a flexible line connected to the driving means whereby said driving means may be manipulated by an operator at the ground surface to effect such connection and disconnection.

6. A well shooting gun comprising; a gun body having a barrel extending transversely of the body; a projectile and explosive charge behind the projectile, in the barrel; ignition means in the body for firing the charge; an electric generator on the body; an electrical conductor leading from the generator to the ignition means and including a switch; tubing connected to the body for lowering the body into the well; generator driving means adapted to be lowered through the tubing into operative relation with the generator and through which the generator may be driven; clutch means carried by the driving means and generator whereby they may be operatively connected and disconnected; a flexible line connected to the driving means whereby said driving means may be manipulated by an operator at the ground surface to effect such connection and disconnection; and means associated with the driving means and effective to close the switch simultaneously with the connection of the driving means with the generator.

7. A well shooting gun comprising; a gun body having a plurality of barrels extending transversely of the body; a projectile and explosive charge behind the projectile, in each barrel; ignition means in the body for firing the respective charges; an electric generator on the body; electrical conductors leading to the respective ignition means; switch means arranged to be operated to successively connect the conductors with the generator for successively firing said charges; suspension means connected to the body for lowering the body into the well; generator driving means adapted to be lowered into the well into operative relation with the generator and through which the generator may be driven; clutch means carried by the driving means and generator whereby they may be operatively connected and disconnected; a flexible line connected to the driving means whereby said driving means may be manipulated by an operator at the ground surface to effect such connection and disconnection; means associated with the driving means and effective to close the switch simultaneously with the connection of the driving means with the generator; and interengageable means on said suspension means and body effective upon operative connection of the generator and driving means to hold the body and driving means against relative rotation.

8. A well shooting gun comprising; a gun body having a plurality of barrels extending transversely of the body; a projectile and explosive charge behind the projectile, in each barrel; ignition means in the body for firing the respective charges; an electric generator on the body; electrical conductors leading to the respective ignition means; switch means arranged to be operated to successively connect the conductors with the generator for successively firing said charges; tubing connected to the body for lowering the body into the well; generator driving means, adapted to be lowered through the tubing into operative relation with the generator and through which the generator may be driven; a housing enclosing said driving means; clutch means carried by the driving means and generator whereby they may be operatively connected and disconnected; a flexible line connected to the housing whereby the housing may be manipulated by an operator at the ground surface to effect such connection and disconnection; means associated with the driving means and effective to close the switch simultaneously with the connection of the driving means with the generator, and interengageable means on the tubing and housing effective when the driving means and generator are connected to hold said housing against rotation relative to said body.

9. In a well shooting gun, a switch mechanism comprising, two relatively movable parts, an elongated electrical contact member on one of said parts, a series of electrical contacts on the other part with which said contact member contacts successively upon relative movement of said relatively movable parts, one of said parts having recesses, frangible pins anchored to the other part and projecting into said recesses.

10. In a well shooting gun, a switch mechanism comprising, two relatively movable parts, an elongated electrical contact member on one of said parts, a series of electrical contacts on the other parts with which said contact member contacts successively upon relative movement of said relatively movable parts, one of said parts having recesses, frangible pins anchored to the other parts and projecting into said recesses, said recesses being of different widths so that the pins will be successively sheared as said relatively movable parts are so relatively moved.

ERICK L. AHLGREN.

REFERENCES CITED

The following references are of record in the file of this patent:

UNITED STATES PATENTS

| Number | Name | Date |
|---|---|---|
| 2,020,410 | Greene | Nov. 12, 1935 |
| 2,105,286 | Jennings | Jan. 11, 1938 |
| 2,113,666 | Suman | Apr. 12, 1938 |
| 2,169,671 | Walker | Aug. 15, 1939 |
| 2,202,887 | Aloi | June 4, 1940 |
| 2,210,125 | Raymond | Aug. 6, 1940 |
| 2,260,769 | Bonham | Oct. 28, 1941 |
| 2,266,355 | Chun | Dec. 16, 1941 |
| 2,331,058 | Stick | Oct. 5, 1943 |